United States Patent [19]

Maitland et al.

[11] 4,052,604

[45] Oct. 4, 1977

[54] BINARY ADDER

[75] Inventors: David Steven Maitland; Billy E. Thayer, both of Loveland, Colo.

[73] Assignee: Hewlett-Packard Company, Palo Alto, Calif.

[21] Appl. No.: 650,211

[22] Filed: Jan. 19, 1976

[51] Int. Cl.² .............................................. G06F 7/50
[52] U.S. Cl. ..................................... 364/786; 364/770
[58] Field of Search ......................................... 235/175

[56] References Cited

U.S. PATENT DOCUMENTS

| 3,249,746 | 5/1966 | Helbig et al. | 235/175 |
| 3,454,751 | 7/1969 | Brastins et al. | 235/175 X |
| 3,465,133 | 9/1969 | Booher | 235/175 |
| 3,766,371 | 10/1973 | Suzuki | 235/175 |
| 3,843,876 | 10/1974 | Fette et al. | 235/175 |
| 3,932,734 | 1/1976 | Parsons | 235/175 |

OTHER PUBLICATIONS

J. P. Beraud, "High-Speed Four-Bit Adder", *IBM Technical Disclosure Bulletin*, vol. 16, No. 12, May 1974, pp. 3950-3951.

*Primary Examiner*—David H. Malzahn
*Attorney, Agent, or Firm*—William E. Hein

[57] ABSTRACT

A binary adder employs separate summing and carry circuitry within each digit to optimize the speed of operation of the adder. Carry bits of less significant digits are calculated independently of corresponding sum bits, thus allowing propagation of such carry bits to more significant digits before completion of the summation of the less significant digits.

3 Claims, 3 Drawing Figures

BINARY ADDER

BACKGROUND AND SUMMARY

The speed of a binary adder is limited, in part, by the speed at which any carry bit signal issued in the course of summing corresponding digits of the two binary numbers being added can be propagated through successive more significant digits of the adder. Prior art binary adders are disadvantageous in that the carry bit from a less significant digit within the adder cannot be propagated to the next more significant digit until a summation of the less significant digits has been completed.

Accordingly, it is the principal object of this invention to provide a binary adder having the capability of propagating any carry bit signal, calculated in the course of summing corresponding digits of the numbers being added, prior to the time the addition has been completed.

It is a further object of this invention to provide isolation between successive digits of the binary adder in order to prevent circuitry of more significant digits from affecting signals associated with less significant digits.

These objects are accomplished in accordance with the preferred embodiment of this invention by employing separate logic circuitry within each digit of the binary adder to determine the status of the output carry bit signal based solely on the status of bits from the corresponding digits of the numbers being added and the carry bit signal from the preceding less significant digit of the adder. The status of this output carry bit signal may be determined prior to the completion of the calculation of the sum of the corresponding digits of the numbers being added and the carry bit from the preceding less significant digit of the adder by means of this separate logic circuitry. Therefore, summation of more significant digits may be commenced by the binary adder prior to completion of the summation of less significant digits.

Interference with signals associated with less significant digits of the binary adder by circuitry associated with more significant digits is prevented by insertion of a logic inverter between the carry bit output of the less significant digit and the carry input of the succeeding more significant digit. This logic inverter causes the input carry signal for even digit positions to be complementary to the input signal for odd digit positions, and summing and carry circuitry within the even and odd digit positions of the adder is arranged accordingly.

DESCRIPTION OF THE PREFERRED EMBODIMENT

Figure 1:
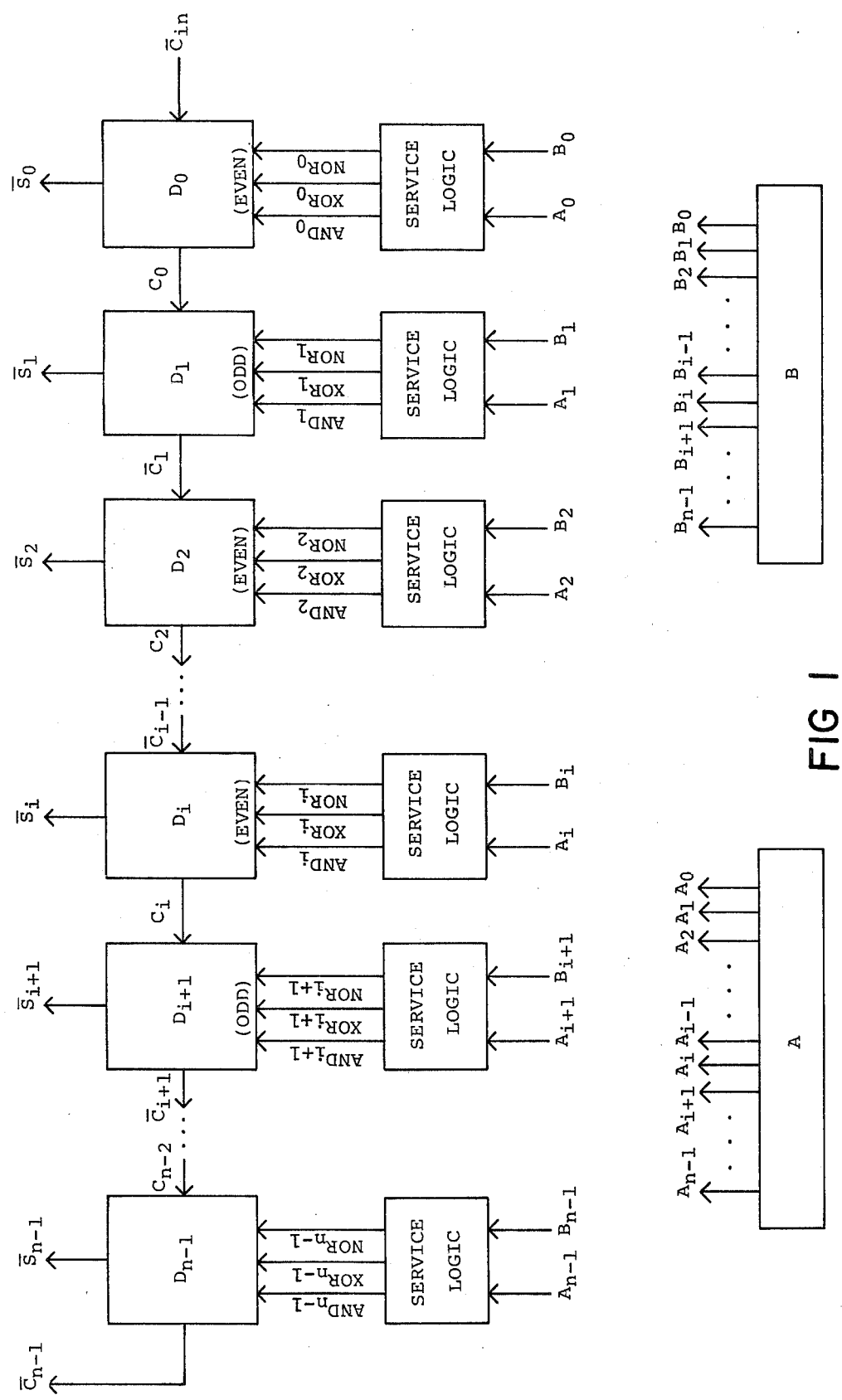
FIG. 1 is a block diagram of a binary adder for summing two binary numbers.

Referring now to FIG. 1, there is shown a block diagram of an adder for summing two binary numbers A and B. Any specific digit $D_i$ of the adder produces a sum bit $S_i$ and a carry bit $C_i$ based on the state of the corresponding bits $A_i$ and $B_i$ of the binary numbers A and B to be summed and the input carry bit $C_{i-1}$ from the preceding less significant digit $D_{i-1}$. Digit $D_0$ is the least significant digit position of the binary adder, and digit $D_{n-1}$ is the most significant digit position. The symbol "n" represents the number of binary digits in the adder. A digit $D_i$ represents any arbitrary digit position in the binary adder.

The logic states of the sum bit $S_i$ and the carry bit $C_i$ for various states of the input bits $A_i$, $B_i$, and $C_{i-1}$ are shown in Table I below.

TABLE 1

| INPUTS | | | OUTPUTS | |
|---|---|---|---|---|
| $A_i$ | $B_i$ | $C_{i-1}$ | $S_i$ | $C_i$ |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

As shown in Table I, if bits $A_i$ and $B_i$ are both zero, output carry bit $C_i$ will be zero regardless of the state of input carry bit $C_{i-1}$. If bits $A_i$ and $B_i$ are both one, output carry bit $C_i$ will be one regardless of the state of input carry bit $C_{i-1}$. If only one of the bits $A_i$ and $B_i$ is one, and the other bit is zero, output carry bit $C_i$ will have the same logical value as input carry bit $C_{i-1}$.

If bits $A_i$ and $B_i$ are both zero, sum bit $S_i$ will have the same value as input carry bit $C_{i-1}$. Also, if bits $A_i$ and $B_i$ are both one, sum bit $S_i$ will have the same logical value as input carry bit $C_{i-1}$. Finally, if only one of the bits $A_i$ and $B_i$ is one, and the other bit is zero, sum bit $S_i$ will be complementary to the logical value of input carry bit $C_{i-1}$.

These relationships may be expressed symbolically as follows:

1. If $NOR_i = 1$, then $C_i = 0$, where $NOR_i = \overline{A_i + B_i}$

2. If $AND_i = 1$, then $C_i = 1$, where $AND_i = A_i \cdot B_i$

3. If $XOR_i = 1$, then $C_i = C_{i-1}$, where $XOR_i = A_i \cdot \overline{B_i} + \overline{A_i} \cdot B_i$ 4. If $NOR_i = 1$, $S_i = C_{i-1}$ 5. If $AND_i = 1$, $S_i = C_{i-1}$ 6. If $XOR_i = 1$, $S_i = \overline{C_{i-1}}$ These relationships are referred to hereinbelow as equations (1) through (6). The values of $NOR_i$, $AND_i$, and $XOR_i$, defined in equations (1) - (3), for all combinations of $A_i$ and $B_i$ are given in Table 2 below.

TABLE 2

| $A_i$ | $B_i$ | $NOR_i$ | $AND_i$ | $XOR_i$ |
|---|---|---|---|---|
| 0 | 0 | 1 | 0 | 0 |
| 0 | 1 | 0 | 0 | 1 |
| 1 | 0 | 0 | 0 | 1 |
| 1 | 1 | 0 | 1 | 0 |

It may be seen that the logical relationships $XOR_i$, $AND_i$, and $NOR_i$ are mutually exclusive: that is, only one of such relationships will have a logical value of one for any selected combination of bits $A_i$ and $B_i$. By defining the relationships between $A_i$ and $B_i$ in the above way, circuitry for implementing addition of two binary numbers A and B is simplified. This simplification is possible because the same logic signals, $AND_i$, $NOR_i$, and $XOR_i$, may be employed in both the summing and carry circuitry for each digit.

Figure 2:
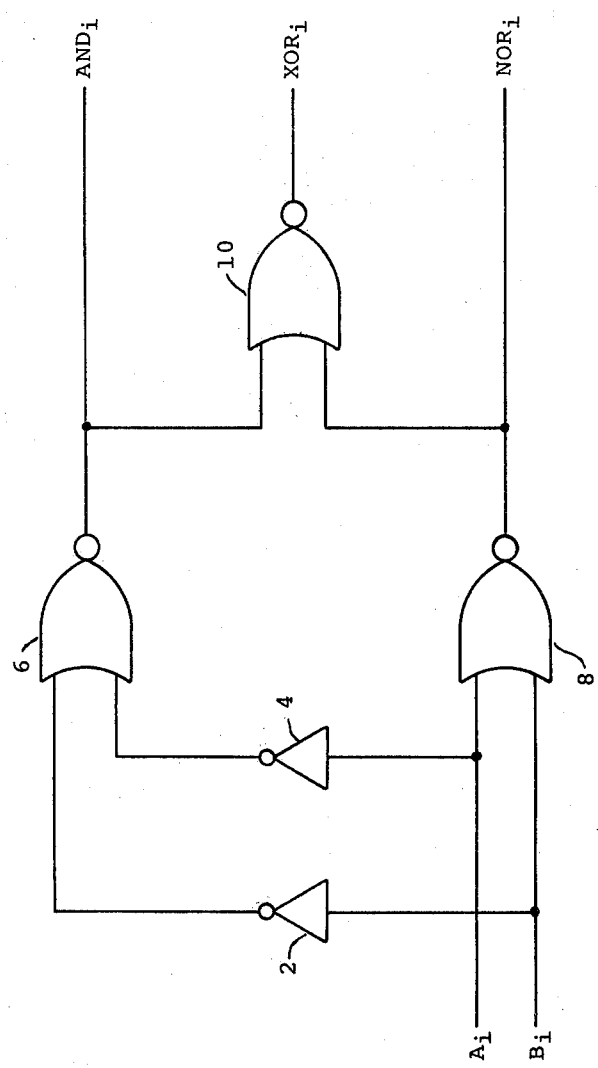
FIG. 2 is a diagram of service logic circuitry for producing logic signals that control the carry and summing circuitry of FIG. 3.

Referring now to FIG. 2, there is shown service logic circuitry for receiving the bits $A_i$ and $B_i$ and for producing the logic signals corresponding to $AND_i$, $XOR_i$, and $NOR_i$ in accordance with Table 2 above.

Bits $A_i$ and $B_i$ are supplied as inputs to an inverting OR gate 8 to produce the signal $NOR_i$. Bits $A_i$ and $B_i$ are also inverted by two inverters 2 and 4, and then supplied to an inverting OR gate 6 to produce the signal $AND_i$. (It can be shown by basic Boolean manipulations that $\overline{A_i} + \overline{B_i} = AND_i$.) The signals $AND_i$ and $NOR_i$ are supplied as inputs to an inverting OR gate 10 to produce the signal $XOR_i$. (Reference to Table 2 shows that $\overline{NOR_i + AND_i} = XOR_i$.)

Figure 3:
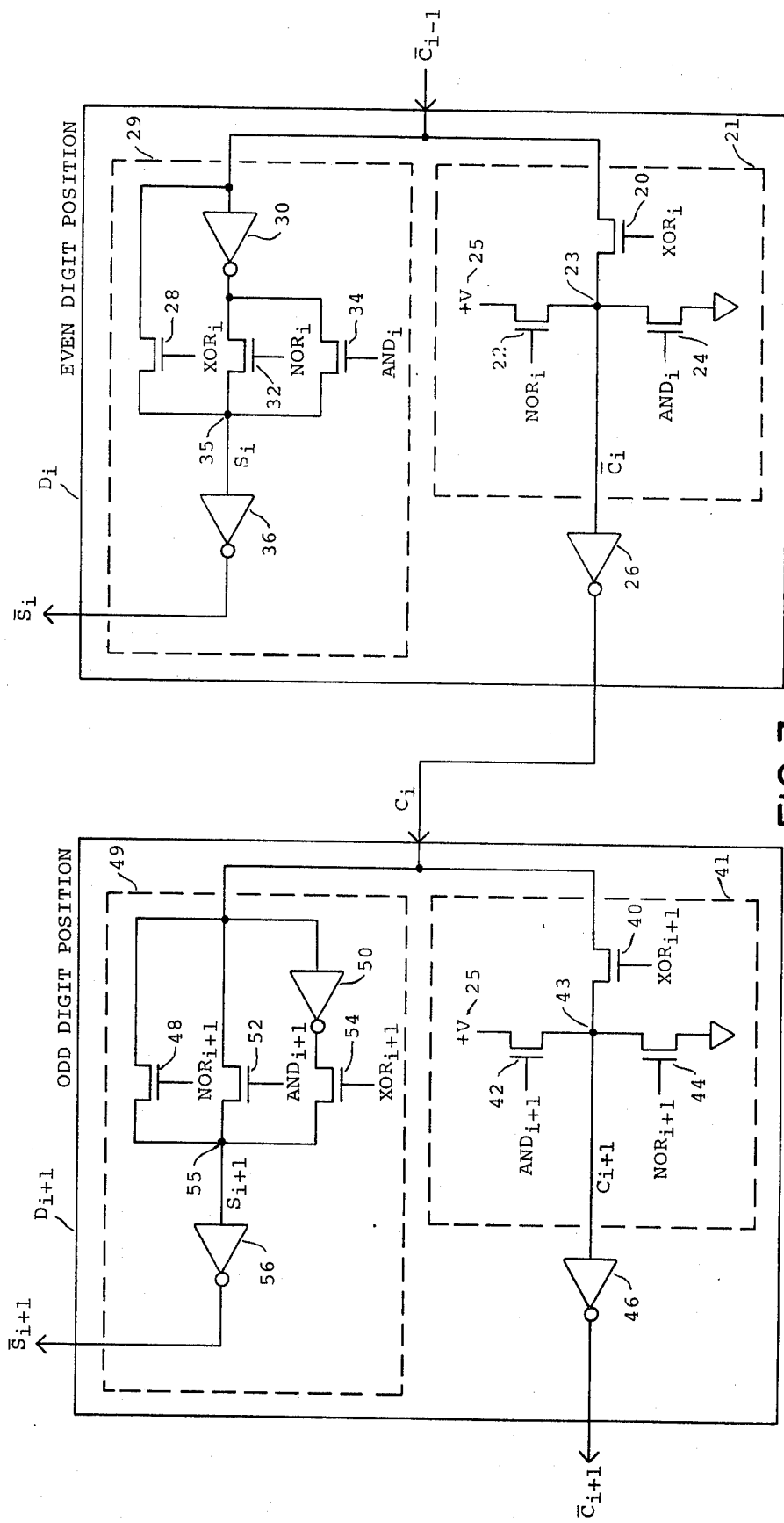
FIG. 3 is a schematic diagram of carry and summing circuitry of representative successive even and odd digit positions of the binary adder of FIG. 1.

Referring now to FIG. 3, there is shown circuitry employing the logic signals produced by the service logic circuitry of FIG. 2 to implement the logical relationships of equations (1) through (6) above. While the circuitry of FIG. 3, described hereinbelow, comprises logic circuits which respond to signals from the separate service logic circuitry of FIG. 2, those persons skilled in the art will appreciate that logic circuits directly responsive to the logic levels of the bits $A_i$ and $B_i$ could also be employed within the circuitry for each digit to implement the logical relationships of equations (1) through (6) above. The service logic of FIG. 2 would then be eliminated, while the circuitry illustrated in FIG. 3 would become more complex.

Representative circuitry for an even digit position $D_i$ and an odd digit position $D_{i+1}$ are shown in FIG. 3. For reasons discussed hereinbelow, circuitry for an even digit position will have as its input from the previous less significant digit a signal representing the logical complement of the output carry bit of that prior digit. For example, the carry input to even digit position $D_i$ is a signal $\overline{C_{i-1}}$ representing the complement of the output carry bit $C_{i-1}$ of preceding odd digit position $D_{i-1}$. Circuitry for the even digit position $D_i$ comprises a carry circuit 21, a summing circuit 29, and an inverter 26. Circuitry for the odd digit position $D_{i+1}$ comprises a carry circuit 41, a summing circuir 49, and an inverter 46.

Carry circuit 21 for even digit position $D_i$ operates as follows:

If $NOR_i = 1$, a transfer gate 22 is turned on, and a junction 23 is forced to the voltage level of a voltage supply 25, which represents a logical one. The inverter 26 inverts the logic level at junction 23 to produce the output carry signal $C_i$ equal to logical zero. This operation implements equation (1).

If $AND_i = 1$, a transfer gate 24 is turned on, and junction 23 is forced to ground to produce a logical zero. The logic level at junction 23 is inverted by inverter 26 to produce an output carry bit $C_i$ equal to logical one. This operation implements equation (2).

If $XOR_i = 1$, a transfer gate 20 is turned on, and junction 23 assumes the value of input signal $\overline{C_{i-1}}$. Inverter 26 then produces output carry bit $C_i$ equal to the logic value of carry bit $C_{i-1}$. This operation implements equation (3).

Carry circuit 41 for odd digit position $D_{i+1}$ operates as follows:

If $NOR_{i+1} = 1$, a transfer gate 44 is turned on, and a junction 43 is forced to ground or logical zero. Output carry bit $C_{i+1}$ is represented by the signal at junction 43. This operation implements equation (1) for digit $D_{i+1}$.

If $AND_{i+1} = 1$, a transfer gate 42 is turned on, and junction 43 is forced to the level of voltage supply 25, or logical one. This operation implements equation (2).

If $XOR_{i+1} = 1$, a transfer gate 40 is turned on, and junction 43 assumes the value of input carrybit $C_i$. This operation implements equation (3).

The signal appearing at junction 43 is inverted by the inverter 46 to produce an output signal $\overline{C_{i+1}}$ complementary to the logic level of the output carry bit for digit $D_{i+1}$.

The summing circuit 29 for even digit position $D_i$ operates as follows:

If the signal $NOR_i = 1$, a transfer gate 32 is turned on, and a signal representing the input carry bit $C_{i-1}$, obtained by inverting the input signal $\overline{C_{i-1}}$ through an inverter 30, is coupled to a junction 35. Junction 35 represents the sum bit $S_i$. This operation implements equation (4).

If $AND_i = 1$, a transfer gate 34 is turned on, and junction 35 assumes the logical value of input carry bit $C_{i-1}$. This operation implements equation (5).

If $XOR_i = 1$, a transfer gate 28 is turned on, and the input signal $\overline{C_{i-1}}$ appears at junction 35. This operation implements equation (6). An inverter 36 inverts the signal at junction 35 to provide electrical isolation and to produce an inverted sum bit signal $\overline{S_i}$.

The summing circuit 49 for odd digit position $D_{i+1}$ operates as follows:

If $NOR_{i+1} = 1$, a transfer gate 48 is turned on, and the input carry bit signal $C_i$ is connected to a junction 55 to produce a signal $S_{i+1}$. This operation implements equation (4) for digit $D_{i+1}$.

If $AND_{i+1} = 1$, a transfer gate 52 is turned on, and the input carry bit signal $C_i$ is connected to junction 55 to produce the signal $S_{i+1}$. This operation implements equation (5).

If $XOR_{i+1} = 1$, a transfer gate 54 is turned on, and a signal $\overline{C_i}$, obtained by inverting the input carry bit signal $C_i$ through an inverter 50, is applied to junction 55. This operation implements equation (6). The signal $S_{i+1}$ at junction 55 is applied to an inverter 56 to produce an inverted sum bit signal $\overline{S_{i+1}}$.

Any number of pairs of summing and carry circuits for even and odd digit positions may be linked together to create a binary adder of required length. The linkage is accomplished through inverters 26 and 46, which are employed to prevent loading of the signals at junctions 23 and 43, respectively, by circuitry for more significant digits. As illustrated in FIG. 3, the resulting inversion of the signals requires a rearrangement of the circuitry for alternate digits of the adder, but does not require additional components within each digit to process the inverted signals. Those persons skilled in the art will appreciate that, where loading is not a problem, inverters 26 and 46 may be deleted, and all digits of the adder may employ circuitry for odd digit positions, such as digit $D_{i+1}$, or for even digit positions, such as digit $D_i$. In addition, inverters may be interposed between groups of odd digit position circuits and groups of even digit position circuits. This arrangement reduces the number of inverters required to construct a binary adder of required length, but still prevents excessive loading of circuitry associated with less significant digits of the binary adder.

Although the least significant digit $D_o$ does not receive an input carry bit, the same summing and carry circuits as are employed in other even digit positions of the binary adder may be employed for digit $D_o$. For use as digit $D_o$, a voltage supply is connected at the carry input to the even digit position circuit so that an input signal $\overline{C}_{in}$ assumes a constant value of logical one. This corresponds to an input carry bit $C_{in}$ to digit $D_o$ that is a constant logical zero. Those persons skilled in the art will appreciate that input signal $\overline{C}_{in}$ also allows the binary adder to be used to increment a number by one. For example, to increment binary number A by one, binary number B is set to zero and the input signal $\overline{C}_{in}$ is set to logical zero to supply an input carry bit $C_{in}$ equal to logical one to digit $D_o$. The output of the binary adder is then the binary number A incremented by one.

We claim:

1. A binary adder for calculating the sum of first and second binary numbers, each binary number having a plurality of binary digits, the binary adder comprising:
a plurality of service logic circuits, each service logic circuit being connected for receiving corresponding bits of the first and second binary numbers, for producing a first gating signal when the corresponding bits of the binary numbers are both one, for producing a second gating signal when the corresponding bits of the binary numbers are both zero, and for producing a third gating signal when a bit of one binary number is one and the corresponding bit of the other binary number is zero;
a plurality of summing circuits, each summing circuit being connected for receiving the first, second, and third gating signals from a corresponding one of the plurality of service logic circuits, for receiving an input carry signal, for producing a sum bit output signal equal to the logical value of the input carry signal in response to either the first or second gating signal, and for producing a sum bit output signal equal to the logical complement of the input carry signal in response to the third gating signal; and
a plurality of carry circuits, each carry circuit being connected for receiving the first, second, and third gating signals from the corresponding service logic circuit, for receiving the input carry signal, for producing a carry bit output signal representing logical one in response to the first gating signal, for producing a carry bit output signal representing logical zero in response to the second gating signal, and for producing a carry bit output signal equal to the logical value of the input carry signal in response to the third gating signal;
the plurality of service logic, carry, and summing circuits being connected so that the carry bit output signal of a selected carry circuit serves as the input carry signal for both the succeeding more significant carry circuit and the corresponding more significant summing circuit.

2. A binary adder for calculating the sum of first and second binary numbers, each binary number having a plurality of binary digits, the binary adder comprising:
a plurality of first summing circuits, each first summing circuit being connected for receiving corresponding bits of the first and second binary numbers, for receiving an input carry signal, for producing a sum bit output signal equal to the logical value of the input carry signal when corresponding bits of the first and second binary numbers are both zero or are both one, and for producing a sum bit output signal equal to the logical complement of the input carry signal when a bit of one binary number is one and the corresponding bit of the other binary number is zero;
a plurality of second summing circuits, each second summing circuit being connected for receiving corresponding bits of the first and second binary numbers, for receiving an inverted carry signal, for producing a sum bit output signal equal to the logical complement of the inverted input carry signal when corresponding bits of the first and second binary numbers are both zero or are both one, and for producing a sum bit output signal equal to the logical value of the inverted input carry signal when a bit of one binary number is one and the corresponding bit of the other binary number is zero;
a plurality of first carry circuits, each first carry circuit being connected for receiving corresponding bits of the first and second binary numbers, for receiving the input carry signal, for producing a first carry bit output signal representing logical one when corresponding bits of both binary numbers are one, for producing a first carry bit output signal representing logical zero when the corresponding bits of both binary numbers are zero, and for producing a first carry bit output signal equal to the logical value of the input carry signal when a bit of one binary number is one and the corresponding bit of the other binary number is zero;
a plurality of second carry circuits, each second carry circuit being connected for receiving corresponding bits of the first and second binary numbers, for receiving an inverted input carry signal, for producing a second carry bit output signal representing logical zero when corresponding bits of both binary numbers are one, for producing a second carry bit output signal representing logical one when the corresponding bits of both binary numbers are zero, and for producing a second carry bit output signal equal to the logical value of the inverted input carry signal when a bit of one binary number is one and the corresponding bit of the other binary number is zero; and
a plurality of inverters, each operative for receiving an input logic signal and for producing a complementary output logic signal;
the plurality of first summing circuits, second summing circuits, first carry circuits, second carry circuits, and inverters being connected so that the first carry bit output signal from each one of said plurality of first carry circuits is connected through a selected one of said plurality of inverters to serve as the inverted input carry signal for both a successive one of said plurality of second carry circuits and an associated one of said plurality of second summing circuits, and being further connected so that the second carry bit output signal from each one of said plurality of second carry circuits is connected through a selected one of said plurality of inverters to serve as the input carry signal for both a successive one of said plurality of first carry circuits and an associated one of said plurality of first summing circuits.

3. A binary adder for calculating the sum of first and second binary numbers, each binary number having a plurality of binary digits, the binary adder comprising:
a plurality of first summing circuits, each first summing circuit being connected for receiving corresponding bits of the first and second binary numbers, for receiving an input carry signal, for producing a sum bit output signal equal to the logical value of the input carry signal when corresponding bits of the first and second binary numbers are both zero or are both one, and for producing a sum bit output signal equal to the logical complement of the input carry signal when a bit of one binary number is one and the corresponding bit of the other binary number is zero;

a plurality of second summing circuits, each second summing circuit being connected for receiving corresponding bits of the first and second binary numbers, for receiving an inverted input carry signal, for producing a sum bit output signal equal to the logical complement of the inverted input carry signal when corresponding bits of the first and second binary numbers are both zero or are both one, and for producing a sum bit output signal equal to the logic value of the inverted input carry signal when a bit of one binary number is one and the corresponding bit of the other binary number is zero;

a plurality of first carry circuits, each first carry circuit being connected for receiving corresponding bits of the first and second binary numbers, for receiving the input carry signal, for producing a first carry bit output signal representing logical one when corresponding bits of both binary numbers are one, for producing a first carry bit output signal representing logical zero when the corresponding bits of both binary numbers are zero, and for producing a first carry bit output signal equal to the logical value of the input carry signal when a bit of one binary number is one and the corresponding bit of the other binary number is zero;

a plurality of second carry circuits, each second carry circuit being connected for receiving corresponding bits of the first and second binary numbers, for receiving an inverted input carry signal, for producing a second carry bit output signal representing logical zero when corresponding bits of both binary numbers are one, for producing a second carry bit output signal representing logical one when the corresponding bits of both binary numbers are zero, and for producing a second carry bit output signal equal to the logical value of the inverted input carry signal when a bit of one binary number is one and the corresponding bit of the other binary number is zero; and a plurality of inverters, each operative for receiving an input logic signal and for producing a complementary output logic signal;

a selected number of the plurality of first summing circuits and an equal number of the plurality of first carry circuits being connected to form at least one first group wherein the first carry bit output signal from each first carry circuit within a selected first group serves as the input carry signal for both a successive first carry circuit and an associated first summing circuit within said first group;

a selected number of the plurality of second summing circuits and an equal number of the plurality of second carry circuits being connected to form at least one second group wherein the second carry bit output signal from each second carry circuit within a selected second group serves as the inverted input carry signal for both a successive second carry circuit and an associated second summing circuit within said second group;

the first and second groups being alternately connected so that the first carry bit output signal from the most significant first carry circuit of a selected first group is connected through an inverter to serve as the inverted input carry signal for both the least significant second summing circuit and the associated second carry circuit of a successive second group, and being further alternately connected so that the second carry bit output signal from the most significant second carry circuit of a selected second group is connected through an inverter to serve as the input carry signal for both the least significant first summing circuit and the associated first carry circuit of a successive first group.

* * * * *